US008741018B2

(12) United States Patent
Belcher et al.

(10) Patent No.: US 8,741,018 B2
(45) Date of Patent: *Jun. 3, 2014

(54) FILTER CARTRIDGE WITH CENTERBOARD, DUST COLLECTORS, AND METHODS

(71) Applicant: Donaldson Company Inc., Bloomington, MN (US)

(72) Inventors: Mark Belcher, Burnsville, MN (US); Matthew A. Kalis, Cottage Grove, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,290

(22) Filed: Jan. 28, 2013

(65) Prior Publication Data

US 2013/0205728 A1    Aug. 15, 2013

Related U.S. Application Data

(63) Continuation of application No. 12/886,990, filed on Sep. 21, 2010, now Pat. No. 8,361,182.

(60) Provisional application No. 61/248,237, filed on Oct. 2, 2009.

(51) Int. Cl.
    *B01D 46/00*    (2006.01)
(52) U.S. Cl.
    USPC ............... 55/498; 55/497; 55/502; 55/499; 55/500; 55/501; 55/337; 55/520; 55/521; 55/283; 55/302; 95/267; 95/268; 95/269; 95/270; 95/271; 95/272; 95/273; 95/280; 156/260; 156/295; 156/302; 156/578; 210/450; 210/446; 210/493.1; 210/493.4; 210/493.5

(58) Field of Classification Search
    USPC ........... 55/502, 497, 498, 499, 500, 501, 337, 55/520, 521, 283, 302, DIG. 5, DIG. 12; 95/267, 268, 269, 270, 271, 272, 273, 95/280; 156/260, 295, 302, 578; 210/450, 210/446, 493.1, 493.4, 493.5
    See application file for complete search history.

(56) References Cited

U.S. PATENT DOCUMENTS 1,238,068 A    8/1917    Slater et al.
2,064,207 A    12/1936   Jacobs
(Continued)

FOREIGN PATENT DOCUMENTS

DE    962 066        4/1957
DE    3405719 A1    8/1985
(Continued)

*Primary Examiner* — Duane Smith
*Assistant Examiner* — Minh-Chau Pham
(74) *Attorney, Agent, or Firm* — Merchant & Gould P.C.

(57) ABSTRACT

An air filter cartridge is provided including an air filter media construction having a first, outlet end, flow face and an opposite, second, inlet end, flow face. The filter media construction has fluted media secured to a facing media sheet. The filter media is closed to flow of unfiltered air completely therethrough. A centerboard is provided. The centerboard has a media portion embedded within the media construction. The centerboard has first and second opposite sides. The media portion that is embedded within the media defines an aperture arrangement extending completely through the centerboard from the first side to the second side. An adhering sealant secures the centerboard to the media construction. At least some adhering sealant extends through the aperture arrangement.

20 Claims, 14 Drawing Sheets

(56) References Cited

U.S. PATENT DOCUMENTS

| | | |
|---|---|---|
| 2,599,604 A | 6/1952 | Bauer et al. |
| 2,887,177 A | 5/1959 | Mund et al. |
| 2,890,796 A | 6/1959 | Blood |
| 2,914,785 A | 12/1959 | Ela |
| 3,025,963 A | 3/1962 | Bauer |
| 3,209,917 A | 10/1965 | Yelinek |
| 3,216,578 A | 11/1965 | Wright et al. |
| 3,520,417 A | 7/1970 | Durr et al. |
| 3,676,242 A | 7/1972 | Prentice |
| 3,695,012 A | 10/1972 | Rolland |
| 3,695,437 A | 10/1972 | Shaltis |
| 3,712,033 A | 1/1973 | Gronholz |
| 3,807,150 A | 4/1974 | Maracle |
| 3,841,953 A | 10/1974 | Lohkamp et al. |
| 3,849,241 A | 11/1974 | Butin et al. |
| 3,878,014 A | 4/1975 | Melead |
| 3,912,631 A | 10/1975 | Turman |
| 3,996,914 A | 12/1976 | Crall et al. |
| 4,065,341 A | 12/1977 | Cub |
| 4,093,435 A | 6/1978 | Marron et al. |
| 4,158,449 A | 6/1979 | Sun et al. |
| 4,159,899 A | 7/1979 | Deschenes |
| 4,162,906 A | 7/1979 | Sullivan et al. |
| 4,187,091 A | 2/1980 | Durre et al. |
| 4,201,819 A | 5/1980 | Schenz |
| 4,247,316 A | 1/1981 | Putman |
| 4,255,175 A | 3/1981 | Wilkins |
| 4,316,801 A | 2/1982 | Cooper |
| 4,322,231 A | 3/1982 | Hilzendeger et al. |
| 4,359,330 A | 11/1982 | Copley |
| 4,394,147 A | 7/1983 | Caddy et al. |
| 4,402,830 A | 9/1983 | Pall |
| 4,410,430 A | 10/1983 | Hagler, Jr. |
| 4,430,223 A | 2/1984 | Miyakawa et al. |
| 4,449,993 A | 5/1984 | Bergeron |
| 4,537,608 A | 8/1985 | Koslow |
| 4,575,422 A | 3/1986 | Zimmer |
| 4,589,983 A | 5/1986 | Wydevan |
| RE32,185 E | 6/1986 | Copley |
| 4,617,122 A | 10/1986 | Kruse et al. |
| 4,673,503 A | 6/1987 | Fujimoto |
| 4,678,489 A | 7/1987 | Bertelsen |
| 4,767,531 A | 8/1988 | Holzer |
| 4,810,379 A | 3/1989 | Barrington |
| 4,963,171 A | 10/1990 | Osendorf |
| 4,997,466 A | 3/1991 | Hood |
| 5,069,790 A | 12/1991 | Mordeki |
| 5,125,941 A | 6/1992 | Ernst et al. |
| 5,211,846 A | 5/1993 | Kott et al. |
| 5,240,479 A | 8/1993 | Bachinski |
| 5,290,621 A | 3/1994 | Bach et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,443,891 A | 8/1995 | Bach |
| 5,472,463 A | 12/1995 | Herman et al. |
| 5,487,767 A | 1/1996 | Brown |
| 5,531,892 A | 7/1996 | Duffy |
| 5,536,290 A | 7/1996 | Stark et al. |
| 5,543,007 A | 8/1996 | Takagaki et al. |
| 5,547,480 A | 8/1996 | Coulonvaux |
| 5,601,717 A | 2/1997 | Villette et al. |
| 5,613,992 A | 3/1997 | Engel |
| 5,624,559 A | 4/1997 | Levin et al. |
| 5,714,126 A | 2/1998 | Frund |
| 5,730,766 A | 3/1998 | Clements |
| 5,820,646 A | 10/1998 | Gillingham et al. |
| 5,846,495 A | 12/1998 | Whittenberger et al. |
| 5,871,557 A | 2/1999 | Tokar et al. |
| 5,895,574 A | 4/1999 | Friedmann et al. |
| 5,897,676 A | 4/1999 | Engel et al. |
| 5,897,787 A | 4/1999 | Keller |
| D417,268 S | 11/1999 | Gillingham |
| 6,017,379 A | 1/2000 | Kauffman |
| D425,189 S | 5/2000 | Gillingham et al. |
| 6,164,457 A | 12/2000 | Schlör |
| 6,179,890 B1 | 1/2001 | Ramos et al. |
| D437,402 S | 2/2001 | Gieseke et al. |
| D439,963 S | 4/2001 | Gieseke et al. |
| 6,231,630 B1 | 5/2001 | Ernst et al. |
| 6,235,195 B1 | 5/2001 | Tokar |
| D444,219 S | 6/2001 | Gieseke et al. |
| 6,348,084 B1 | 2/2002 | Gieseke et al. |
| 6,350,291 B1 | 2/2002 | Gieseke et al. |
| 6,375,700 B1 | 4/2002 | Jaroszczyk et al. |
| 6,391,076 B1 | 5/2002 | Jaroszczyk et al. |
| 6,416,561 B1 | 7/2002 | Kallsen et al. |
| 6,482,247 B2 | 11/2002 | Jaroszczyk et al. |
| 6,511,599 B2 | 1/2003 | Jaroszyzk et al. |
| 6,547,857 B2 | 4/2003 | Gieseke et al. |
| 6,641,637 B2 | 11/2003 | Kallsen et al. |
| 6,746,518 B2 | 6/2004 | Gieseke et al. |
| 6,875,256 B2 | 4/2005 | Gillingham et al. |
| 6,908,494 B2 | 6/2005 | Gillingham et al. |
| 6,916,360 B2 | 7/2005 | Seguin et al. |
| 6,966,940 B2 | 11/2005 | Krisko et al. |
| 7,001,450 B2 | 2/2006 | Gieseke et al. |
| 7,004,986 B2 | 2/2006 | Kopec et al. |
| 7,008,467 B2 | 3/2006 | Krisko et al. |
| 7,090,711 B2 | 8/2006 | Gillingham et al. |
| 7,211,124 B2 | 5/2007 | Gieseke et al. |
| 7,520,913 B2 | 4/2009 | Mills et al. |
| 7,615,091 B2 | 11/2009 | Gieseke et al. |
| 7,674,308 B2 | 3/2010 | Krisko et al. |
| 8,361,182 B2 * | 1/2013 | Belcher et al. .................. 55/502 |
| 2002/0185007 A1 | 12/2002 | Xu et al. |
| 2002/0189457 A1 | 12/2002 | Dallas et al. |
| 2003/0106432 A1 | 6/2003 | Gieseke et al. |
| 2003/0154863 A1 | 8/2003 | Tokar et al. |
| 2004/0255781 A1 | 12/2004 | Tokar et al. |
| 2005/0005767 A1 | 1/2005 | Gieseke et al. |
| 2005/0229561 A1 | 10/2005 | Nepsund et al. |
| 2006/0101998 A1 | 5/2006 | Gieseke et al. |
| 2006/0123754 A1 | 6/2006 | Oelpke et al. |
| 2006/0123990 A1 | 6/2006 | Tokar et al. |
| 2007/0186774 A1 | 8/2007 | Gillingham et al. |
| 2007/0209343 A1 | 9/2007 | Cuvelier |
| 2007/0271886 A1 | 11/2007 | Rieger et al. |
| 2008/0110142 A1 | 5/2008 | Nelson et al. |
| 2009/0199520 A1 | 8/2009 | Mills et al. |
| 2010/0107577 A1 | 5/2010 | Krisko et al. |
| 2010/0115897 A1 | 5/2010 | Krisko et al. |
| 2010/0186353 A1 | 7/2010 | Ackermann et al. |

FOREIGN PATENT DOCUMENTS

| | | |
|---|---|---|
| DE | 44 29 527 A1 | 10/1995 |
| DE | 44 15 890 A1 | 11/1995 |
| EP | 1 364 695 A1 | 11/2003 |
| EP | 1 169 109 B1 | 4/2004 |
| FR | 2 382 258 | 9/1978 |
| FR | 2 766 383 A1 | 1/1999 |
| GB | 945065 | 12/1963 |
| GB | 1 284 403 | 8/1972 |
| GB | 2 106 634 A | 4/1983 |
| JP | 54-108481 | 7/1979 |
| JP | 57-140555 | 8/1982 |
| JP | 59-170669 | 11/1984 |
| JP | 60-112320 | 7/1985 |
| JP | 60-155921 | 10/1985 |
| JP | 61-37458 | 3/1986 |
| JP | 63-31691 | 8/1988 |
| JP | 63-33612 | 9/1988 |
| JP | 1-11971 | 4/1989 |
| JP | 1-171615 | 7/1989 |
| JP | 2-9858 | 3/1990 |
| JP | 2-91616 | 7/1990 |
| JP | 2-31131 | 8/1990 |
| JP | 2-129233 | 10/1990 |
| JP | 3-32923 | 3/1991 |
| JP | 6-1213 | 1/1994 |
| JP | 7-28891 | 7/1995 |
| JP | 9-234321 | 9/1997 |

(56) References Cited

FOREIGN PATENT DOCUMENTS

| WO | WO 97/40917 | 11/1997 |
| WO | WO 00/50153 | 8/2000 |
| WO | WO 2005/037408 A1 | 4/2005 |
| WO | WO 2005/107924 A2 | 11/2005 |
| WO | WO 2008/067029 A1 | 6/2008 |

* cited by examiner

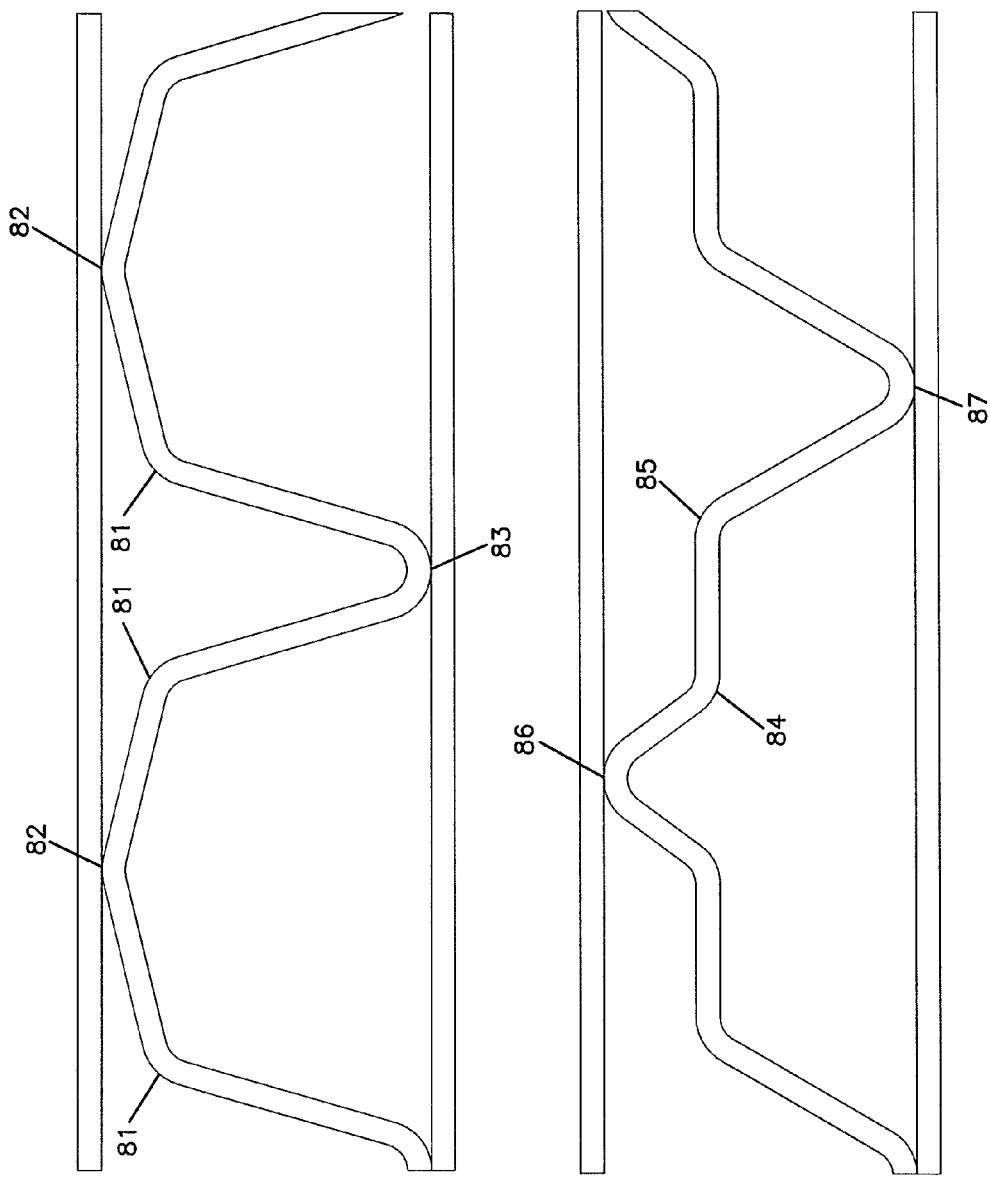

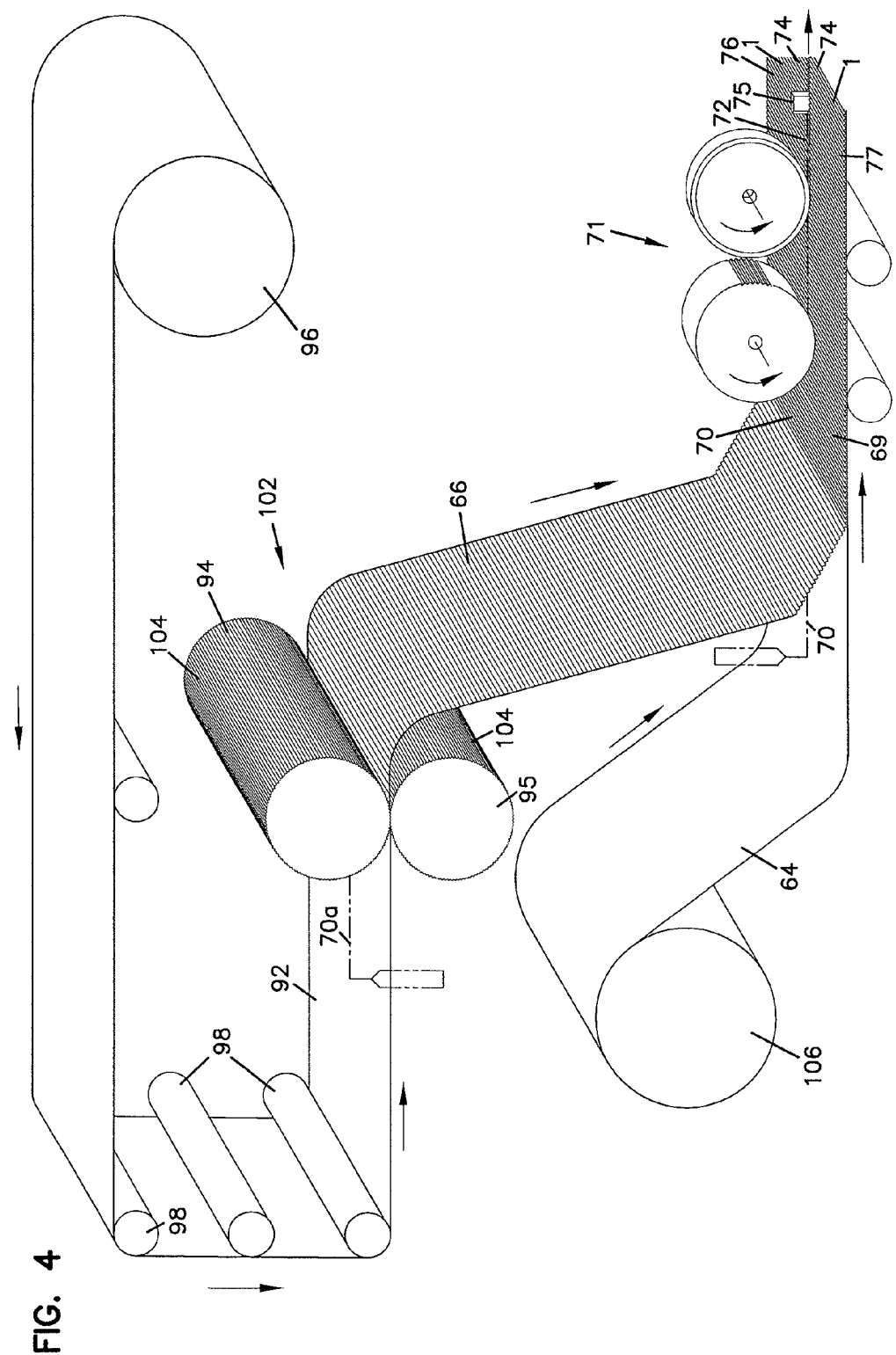

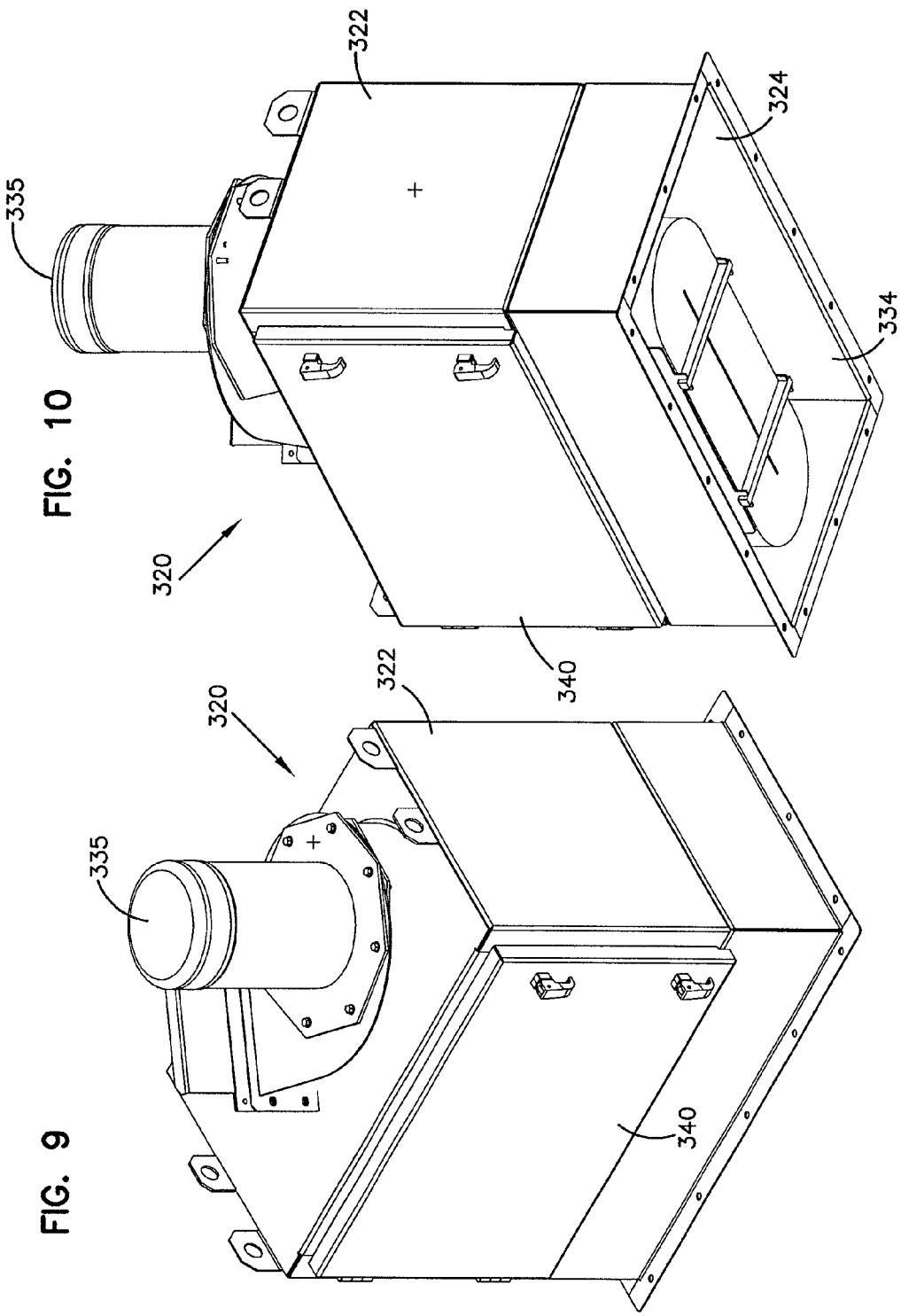

FILTER CARTRIDGE WITH CENTERBOARD, DUST COLLECTORS, AND METHODS

CROSS-REFERENCE TO RELATED APPLICATIONS

The present application is a continuation application of U.S. Ser. No. 12/886,990, filed Sep. 21, 2010, now U.S. Pat. No. 8,361,182, and U.S. Provisional patent application Ser. No. 61/248,237, filed Oct. 2, 2009, which applications are hereby incorporated by reference it their entirety.

TECHNICAL FIELD

This disclosure concerns filters for cleaning air, for example, for use in dust collectors and other equipment.

BACKGROUND

Dust collectors include systems that take in unfiltered air, filter it, and exhaust clean air. Dust collectors are used in a variety of environments, including factories, for example. These systems often have one or more filter elements that are periodically changed out. These systems also sometimes use pressurized gas to direct a pulse of gas (air) from the downstream side of the filter element to the upstream side. This helps to remove some of the dust and debris collected on the upstream side of the filter element, which allows the filter element to be used longer before the restriction becomes so high that it needs to be changed. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein. Improvements in filter elements and dust collectors and methods are desirable.

SUMMARY

An air filter cartridge is provided including an air filter media construction having a first, outlet end, flow face and an opposite, second, inlet end, flow face. The filter media construction comprises fluted media secured to a facing media sheet. The filter media is closed to flow of unfiltered air completely therethrough. A centerboard is provided. The centerboard has a media portion embedded within the media construction. The centerboard has first and second opposite sides. The media portion that is embedded within the media defines an aperture arrangement extending completely through the centerboard from the first side to the second side. An adhering sealant secures the centerboard to the media construction. At least some adhering sealant extends through the aperture arrangement.

In another aspect, a dust collector is provided. The dust collector includes a housing having a dirty air inlet, a clean air outlet, a tubesheet, and a frame arrangement. A first air filter cartridge, as characterized above, is operably installed in the aperture of the tubesheet and sealed against the tubesheet.

In another aspect, a method of making an air filter cartridge is provided. The method includes providing a centerboard including a media portion and having first and second opposite sides. The media portion defines an aperture arrangement extending completely through the centerboard from the first side to the second side. Next, there is a step of coiling z-media around the media portion of the centerboard. While coiling, there is a step of securing the z-media and the centerboard together by using an adhering sealant that extends through the aperture arrangement of the centerboard.

It is noted that not all the specific features described herein need to be incorporated in an arrangement for the arrangement to have some selected advantage according to the present disclosure.

BRIEF DESCRIPTION OF THE DRAWINGS

FIG. 3A is schematic, fragmentary, cross-sectional view of a further fluted media configuration in a single facer media pack;

FIG. 3B is a schematic, fragmentary, cross-sectional view of a still further alternate flute definition;

FIG. 4 is a schematic view of a process for making single facer media for use in a media pack according to the present disclosure;

FIG. 9 is a perspective view of the assembled dust collector of FIG. 8;

FIG. 10 is another perspective view of the dust collector of FIG. 9;

DETAILED DESCRIPTION

Figure 1:
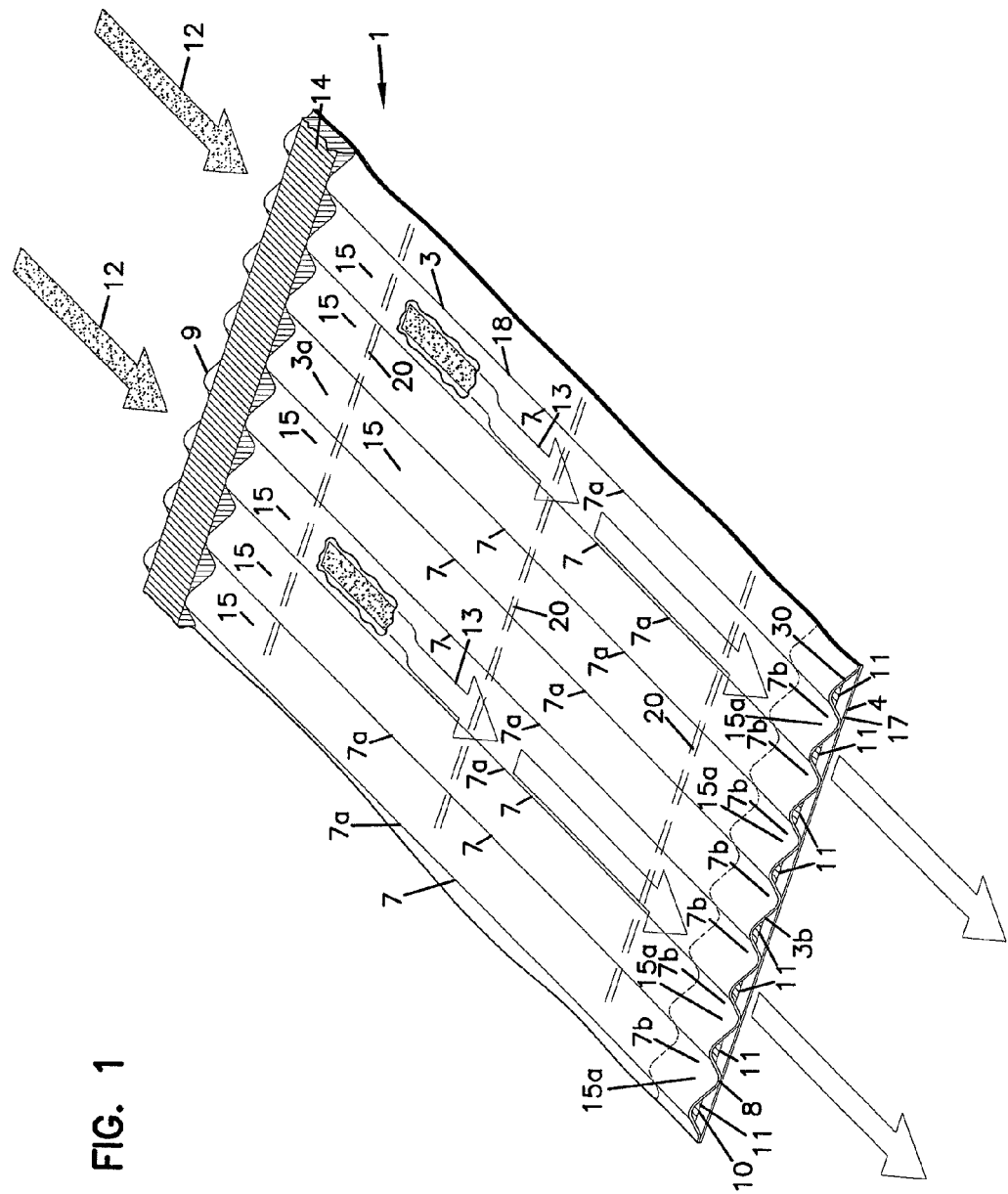
FIG. 1 is a fragmentary, schematic, perspective view of a single facer strip of z-filter media comprising a flutes sheet secured to a facing sheet.

I. Z-Filter Media Configurations, Generally.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428, 128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is shown herein at FIG. 7 and described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending there across.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
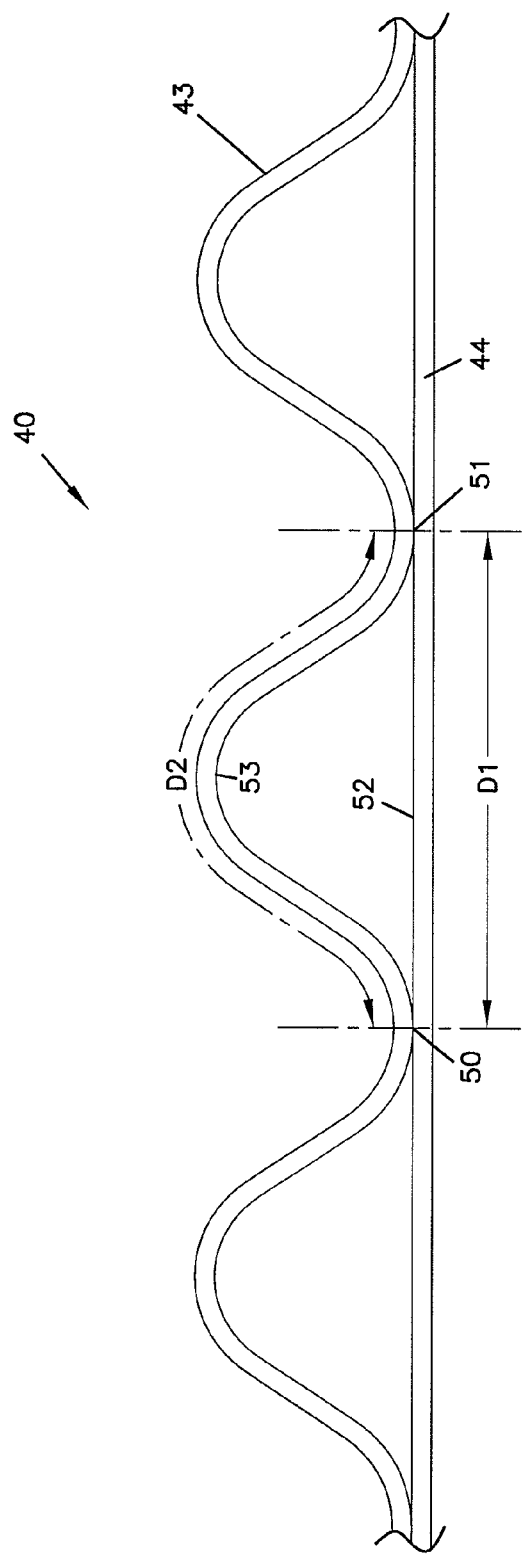
FIG. 2 is an enlarged, schematic, fragmentary view of a single facer sheet comprising fluted media secured to the facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
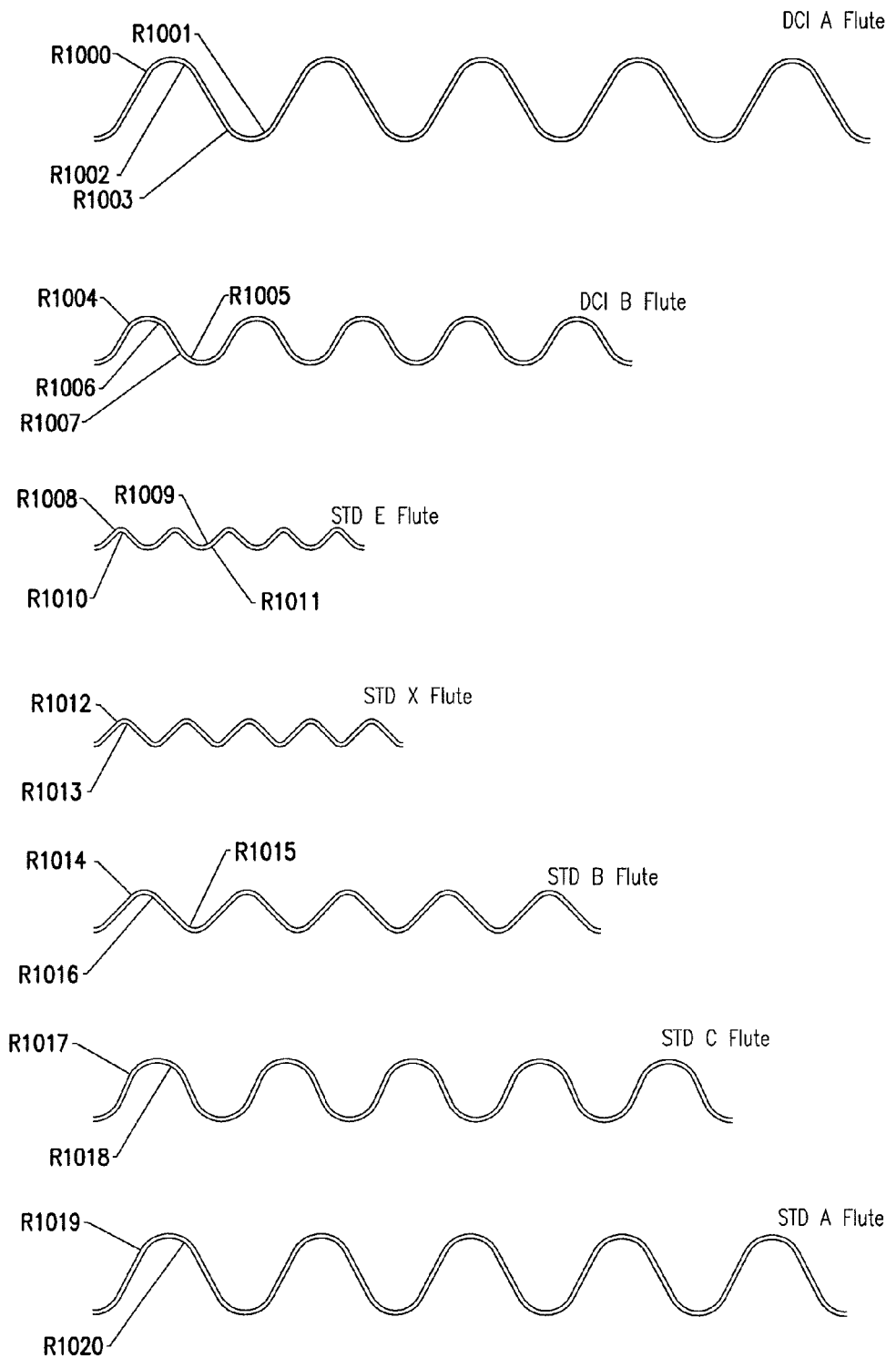
FIG. 3 is a schematic view of various selected flute shapes.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A

| (Flute definitions for FIG. 3) | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below. The complete disclosures of each of U.S. Ser. Nos. 12/215,718 and 12/012,785 are incorporated herein by reference.

Figure 3C:
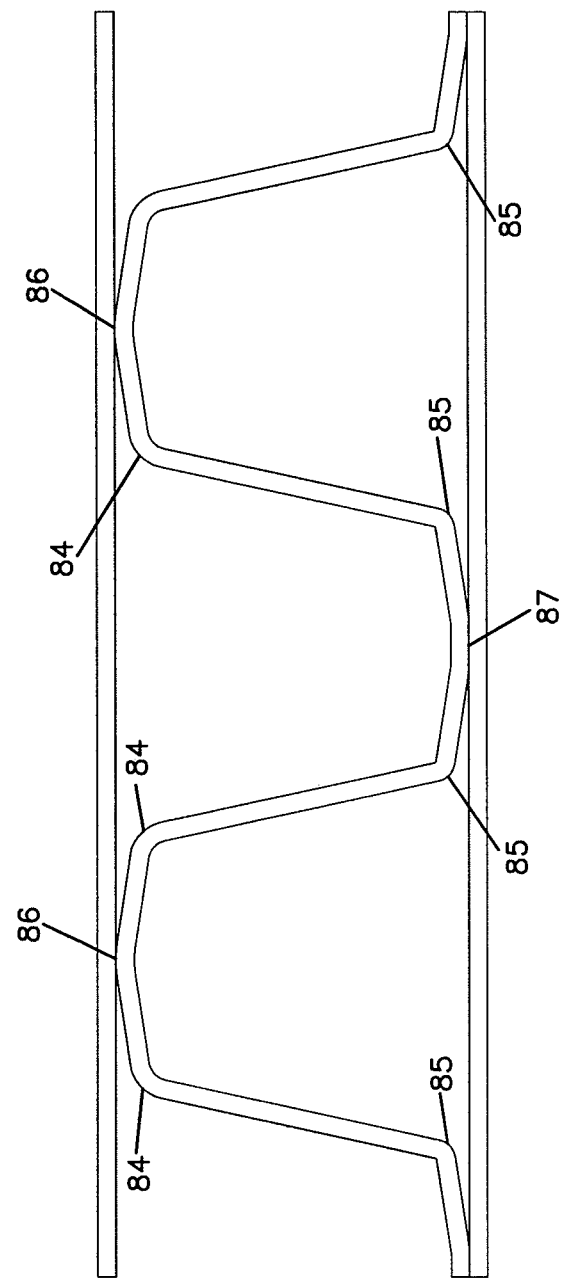
FIG. 3C is a schematic, fragmentary, cross-sectional view of yet another flute definition for a media pack.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge 81 provided between adjacent peaks 82, 83, and FIGS. 3B and 3C show fluted sheets having two non-peak ridges 84, 85 between adjacent peaks 86, 87. The non-peak ridges 81, 84, 85 can extend along the flute length any amount including, for example, an amount of 20% of the flute length to 100% of the flute length. In addition, the fluted sheet can be provided without non-peak ridges 81, 84, 85 between all adjacent peaks 82, 83, 86, 87, and can be provided with differing numbers of non-peak ridges 81, 84, 85 between adjacent peaks 82, 83, 86, 87 (e.g., alternating zero, one, or two non-peak ridges in any arrangement). The presence of non-peak ridges 81, 84, 85 can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Coiled Media Configurations Using Fluted Media, Generally.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located there between at 70. The adhesive bead 70 will form a single facer bead 14, FIG. 1.

The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 7.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown are possible.

Figure 5:
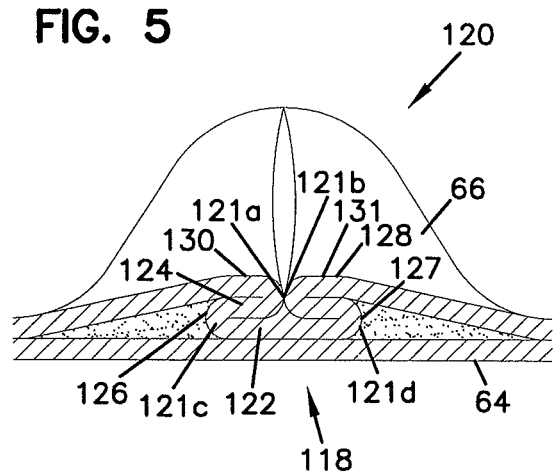
FIG. 5 is a schematic, cross-sectional view of an example of a darted fluted.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, and 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
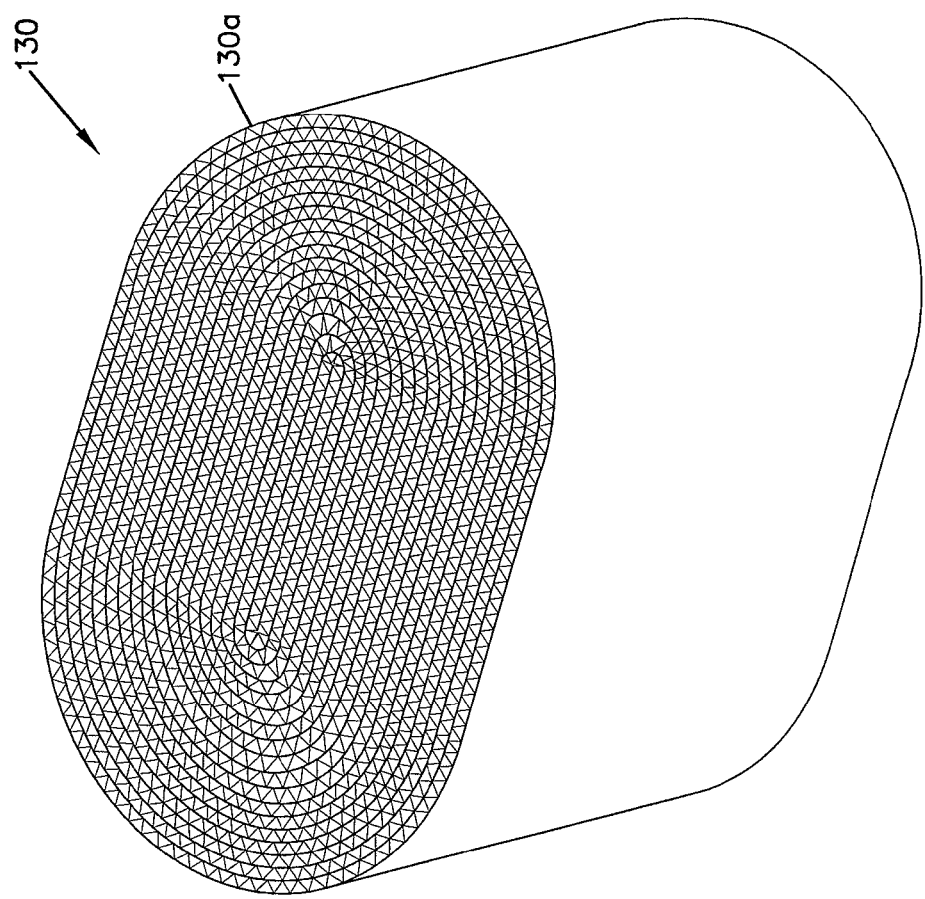
FIG. 6 is a schematic, perspective view of a coiled media construction comprising a coiled sheet of single facer media material.

Reference numeral 130, FIG. 6, generally indicates a coiled media pack 130. The coiled media pack 130 comprises a single strip 130a of single facer material comprising a fluted sheet secured to facing sheet coiled around a center, which can include a core, or which can be careless as illustrated. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

Figure 7:
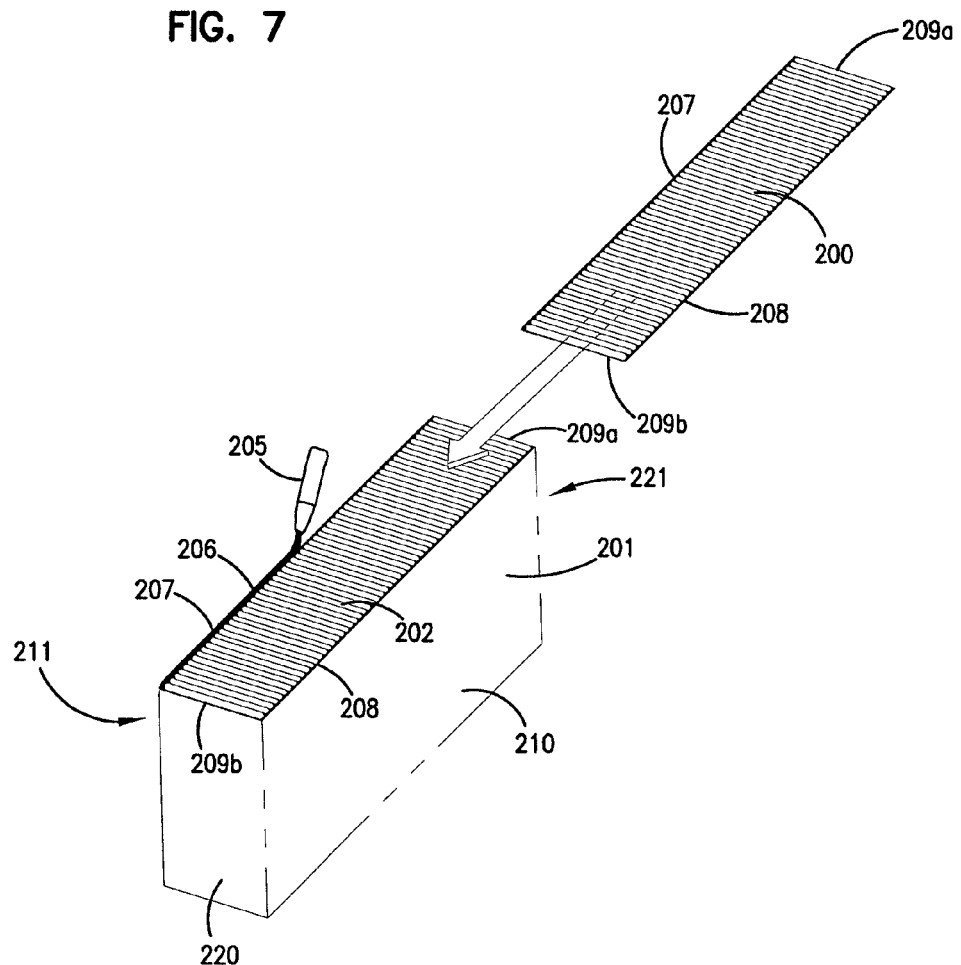
FIG. 7 is a schematic, perspective view of a stacked media construction.

In FIG. 7, schematically there is shown a step of forming a stacked z-filter media pack from strips of z-filter media, each strip being a fluted sheet secured to a facing sheet. Referring to FIG. 7, single facer strip 200 is being shown added to a stack 201 of strips 202 analogous to strip 200. Strip 200 can be cut from either of strips 76, 77, FIG. 4. At 205, FIG. 7, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

III. Example Dust Collector and Components, FIGS. 8-14

A. Overview of Dust Collector

Figure 11:
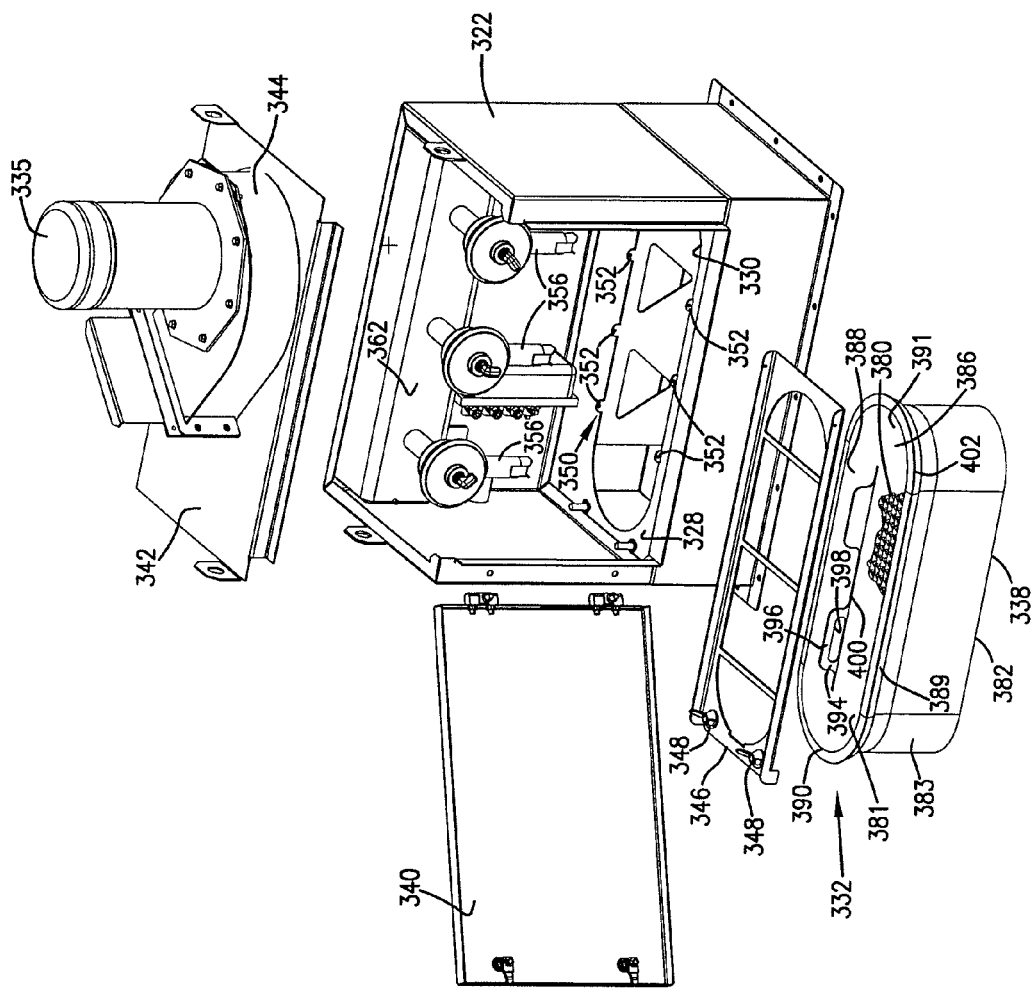
FIG. 11 is an exploded, perspective view of the dust collector of FIGS. 8-10.

In reference to FIGS. 8-11, one embodiment of a dust collector constructed in accordance with principles of this disclosure is illustrated at reference numeral 320. In the embodiment shown, the dust collector 320 includes a housing 322 forming an enclosure with a dirty air chamber 324 (FIG. 10), a filtered air chamber 326, and a tubesheet 328 dividing the housing 322 between the dirty air chamber 324 and the filtered air chamber 326. As can be seen in FIG. 11, the tubesheet 328 defines or includes at least one aperture 330 that will receive a filter element 332. In other embodiments, the tubesheet 328 can define a plurality of apertures, with at least one filter element per aperture.

Figure 8:
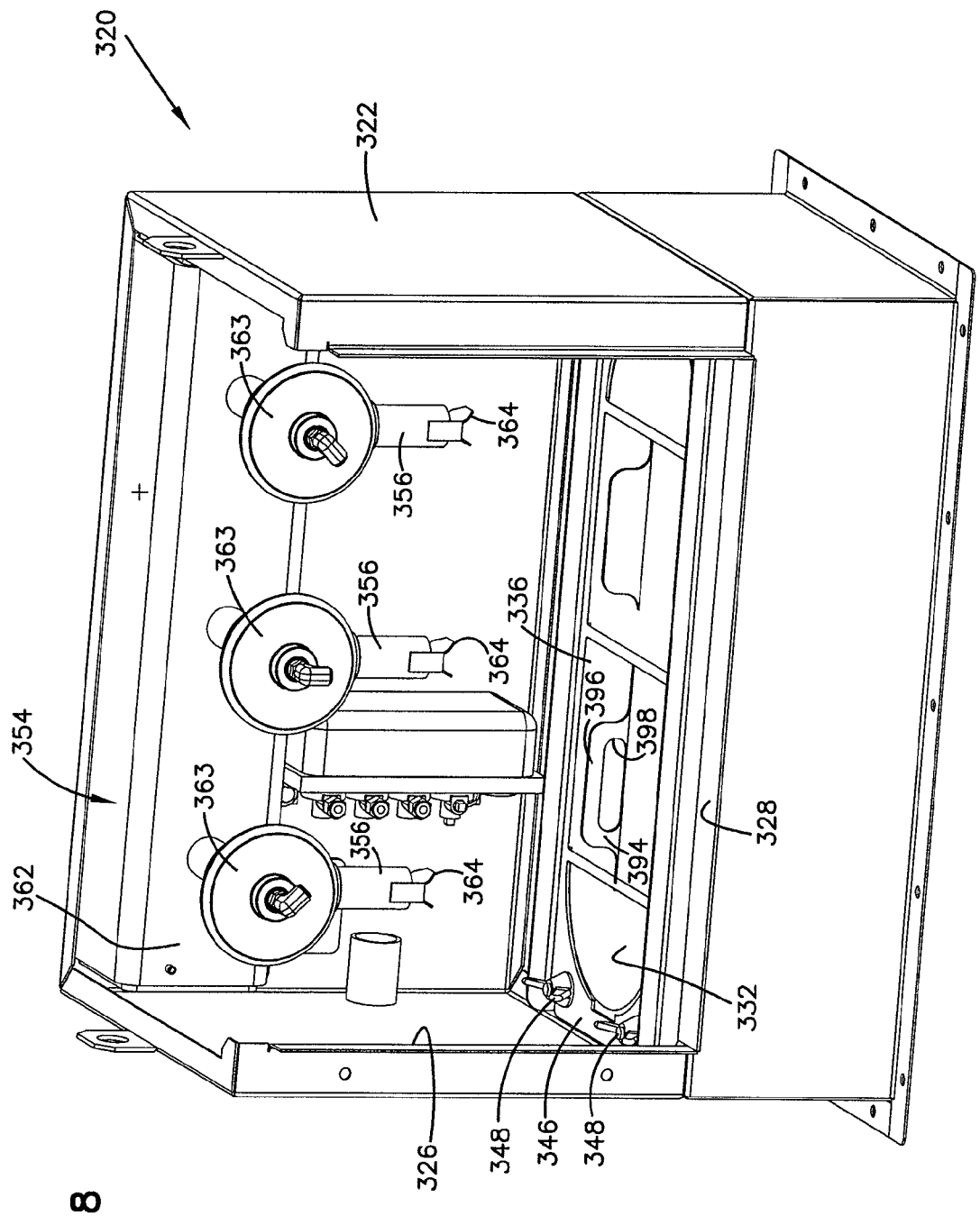
FIG. 8 is a perspective view of one embodiment of a dust collector, with a portion removed to reveal internal components, constructed in accordance with principles of this disclosure.

It should be understood that in FIG. 8, the dust collector 320 has one of the front walls and top walls removed, to facilitate illustration of internal components. The dust collector housing 322 further includes a dirty air inlet, shown generally at 334, but it should be understood, that the inlet 334 can be a channel through a side of the housing, provided it is in communication with the dirty air chamber 324. A clean air outlet 335 is shown extending from an upper portion of the housing 322, and is in communication with the filtered air chamber 326.

In FIG. 11, an exploded perspective view of the dust collector 320 shows a door 340, which provides access to the filtered air chamber 326. Opening the door 340 allows access to the filtered air chamber and to the filter element 332, such that the element 332 can be removed and replaced when servicing the dust collector 320. Also in FIG. 11, the upper panel assembly 342 is shown which includes the outlet 335. A blower housing 344 is part of the upper panel assembly, in this embodiment, and holds a blower, which pulls air through the dust collector 320. In use, the filter element 332 removes at least some contaminant from an airstream as it flows from the dirty air inlet 334, into the dirty air chamber 324, through the filter element 332, into the filtered air chamber 326, and then exits the housing 322 through the outlet 335.

In this embodiment, there is a filter element retainer 346. The filter element retainer 346 is operably positioned over the filter element 332 to pinch the gasket 402 of the filter element 332 between and against the retainer 346 and the tubesheet 328 such that the filter element 332 is sealed against the tubesheet 328. In this embodiment, thumb screws 348 are used to tighten the retainer 346 against the tubesheet 328.

As can also be seen in FIG. 11, in this embodiment, the tubesheet 328 includes a flange arrangement 350, which help to position or seat the filter element 332 properly relative to the tubesheet 328. This is discussed further below. In this embodiment, the flange arrangement 350 includes a plurality of spaced flanges, tabs, or projections 352 projecting or extending axially from the tubesheet 328 at the perimeter of the aperture 330.

B. Example Filter Element

As mentioned above, the tubesheet 328 is mounted in the interior of the housing 322. The tubesheet 328 includes a plurality of openings 330. Within each opening 330 is mounted an individual filter element, which in the illustrated embodiment, is a panel-style filter element 332. By the term "panel-style filter element" it is meant an element with filter media in which, in general, fluid to the filtered flows through the filter element in a straight-flow thorough manner. For example, a panel-style filter element can be pleated media, depth media, fluted media, Z-media including a z-filter construction, or mini V-packs. By "Z-media", it is meant media having first and second opposite flow faces with a plurality of flutes, each of the flutes having an upstream portion adjacent to the first flow face (so that the first flow face is an inlet flow face, where air to be filtered flows in) and a downstream portion adjacent to second flow face (so that the second flow face is an outlet flow face, where filter air exits the element), selected ones at the flutes being open at the upstream portion and closed at the downstream portion, while selected ones of the flutes are closed at the upstream portion and open at the downstream portion. The flutes can be straight, tapered, or darted. The flutes extend between the inlet flow face and the outlet flow face.

FIG. 11 depicts one useful embodiment for the filter element 332 in the collector housing 322. Filter element 332 includes a media construction or media pack 380 of Z-media. The media pack 380 has first and second opposite flow faces 381, 382 and a side wall 383 extending between the first and second flow faces 381, 382. In implementation, the first flow face 381 also corresponds to the downstream (outlet) flow face 336, while the second flow face 382 corresponds to the upstream (inlet) flow face 338.

In the embodiment shown, the media pack 380 includes a non-cylindrical pack of media that is a coiled construction 386. In alternative embodiments, the media pack 380 can be a construction of stacked Z-media. The coiled construction 386 has an overall cross-sectional shape that can be oval or race track-shaped. In the embodiment shown, the media pack 380 is race track-shaped in that it has a pair of straight parallel sides 388, 389 joined by rounded ends 390, 391. In other embodiments, the media pack 380 can be round or rectangular, or rectangular with rounded corners.

In general, the filter element 332 includes a handle portion or handle member 394 extending axially from the first flow face 381. In this embodiment, the handle member 394 includes a projection 396 defining an open aperture 398 sized to accommodate a human hand. The filter element 332 can be made generally in accord with U.S. Pat. No. 6,235,195, incorporated herein by reference.

In this embodiment, the filter element 332 includes a central core 400 embodied as a flat board. The media pack 380 is coiled around the core 400. The core 400 projects above the first flow face and defines the handle member 394 for manipulating the filter element 332. More details on a preferred central core 400 are discussed in connection with FIGS. 13 and 14, below.

The filter element 332 further includes a gasket 402. The gasket 402 is secured to the side wall 383. In preferred implementations, the gasket 402 is molded directly to the side wall 383 of the media pack 380. In other embodiments, the gasket 402 can be pre-made through, for example, an extrusion process and then attached to the side wall 383 of the media pack 380 by glue or an adhesive.

Figure 12:
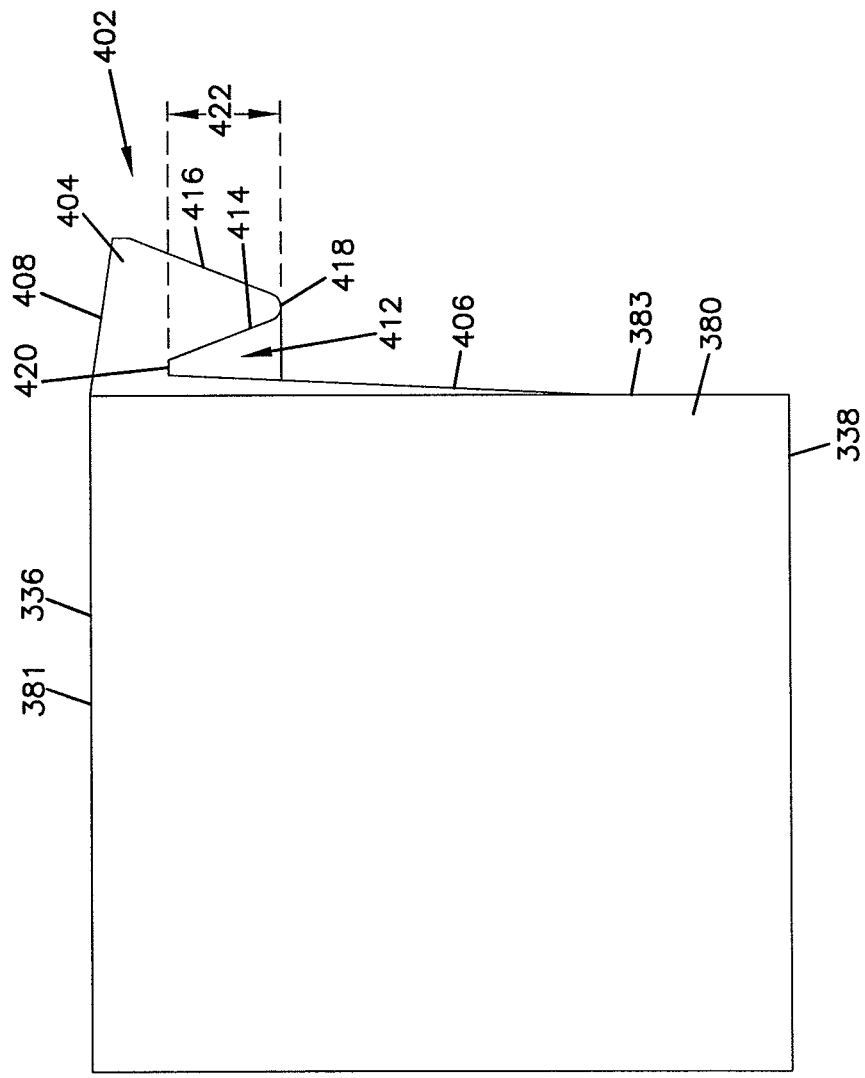
FIG. 12 is a schematic, side elevational view of a portion of the filter element used in the dust collector of FIGS. 8-11.
Figure 13:
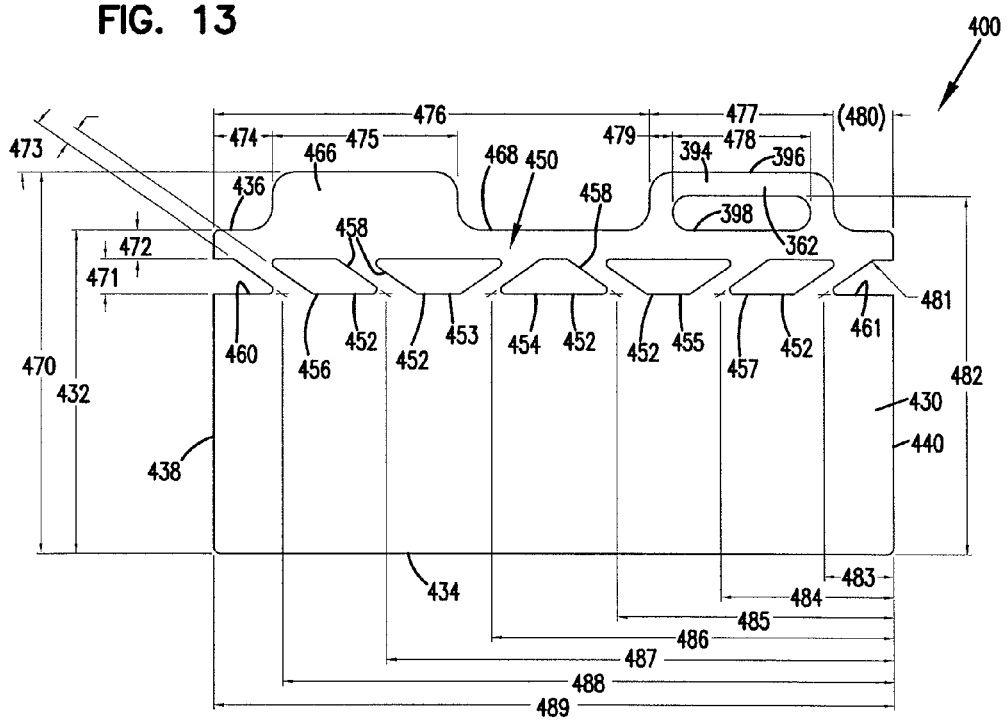
FIG. 13 is a front view of a centerboard used in the filter element in the dust collector of FIGS. 8-11.

FIG. 12 depicts one example gasket 402. In the example shown, the gasket 402 has a sealing portion 404 and an attachment portion 406. The attachment portion 406 is the part of the gasket 402 that is directly secured to the side wall 383 of the media pack 380. The sealing portion 404 is the part of the gasket 402 that is compressed against the tubesheet 328 to form a seal with the tubesheet 328.

In the embodiment shown, the sealing portion 404 has a flat surface 408. In this example, the gasket 402 defines an undercut 412 between the attachment portion 406 and the sealing portion 404. As can also be seen in FIG. 12, the sealing portion 404 includes a first angled surface 414 and a second angled surface 416. The first and second angled surfaces 414, 416 slant toward each other to meet an apex 418. The first angled surface 414 and the attachment portion 406 are joined at a base 420. The first angled surface 414 extends from the attachment portion 406 at the base 420 to the apex 418, while the second angled surface 416 extends from the flat surface 408 to the apex 418. The undercut 412 is defined as a gap between the first angled surface 414 and the attachment portion 406. In the embodiment shown, the attachment portion 406 includes an extension that extends from the surface 408 down past the apex 418.

In the embodiment shown, the undercut 412 is defined by a vertical distance 422 from the base 420 to the apex 418, or end of the first angles surface 414 shown. The flat surface 408 slopes downward and away from the first flow face 381 at an angle that is greater than zero degrees and less than 320 degrees. The undercut 412 receives the flange arrangement 350 projecting or extending from the tubesheet 328, which helps to properly locate or seat the filter element 332 in the tubesheet 328.

In use, the element 332 is installed in dust collector 320 in a manner such that the downstream flow face 336 is about even with the tubesheet 328 or is less than 0.5 inches recessed from the tubesheet 328, inclusive. The filter element 332 can be cleaned by periodically pulsing a jet of fluid or gas into the downstream flow face 336 to cause at least some particulate material on the upstream side 338 of the Z-media pack 380 to be removed from the media pack 380.

C. Reverse Pulse Cleaning Arrangement

A reverse pulse cleaning arrangement 354 is constructed and arranged to periodically emit a pulse of gas into the downstream flow face 336 of the filter element 332 to exit through the upstream flow face 338, which helps to at least partially clean and remove built up dust in the filter element 332. This allows a filter element 332 to have a longer life, than if it were not periodically pulse cleaned. By periodically pulse cleaning the element 332, the element 332 does not prematurely clog full of dust and debris.

In general, the reverse pulse cleaning arrangement 354 can include a number of blow pipes 356 that is an integer of at least 2 or greater. If a single filter element is reverse pulse cleaned by a single blow pipe, this will momentarily stop all of the primary dust collector air flow, as the primary air flow goes from the dirty air chamber 324, through the upstream flow face 338, then through the downstream flow face 336, and finally to the filtered air chamber 326. If a single blow pipe is used, which momentarily stops all of the primary dust collector air flow, this can result in dust flowing back through the system, which can disrupt a process or escape into the surrounding ambient environment. Advantages can be gained by using multiple blow pipes directed at a single filter element to lessen the percent of the filter element that is prevented from allowing the continuous flow of the primary system air flow. Advantages include greatly increasing the pulse coverage area and stopping the problem of interrupting all primary dust collector air flow.

The blow pipes 356, in the embodiment of FIG. 8, are directed perpendicular or normal to the downstream flow face 336. In other embodiments, the blow pipes 356 can be directed at a non-orthogonal angle to the downstream flow face 336. The blow pipes 356 are connected to a manifold 362. The manifold 362 is in communication with compressed gas, such as compressed air, and delivers the compressed gas to the blow pipes 356. Valves 363 control the gas between the manifold 362 and the blow pipes 356.

D. Example Centerboard and Methods, FIGS. 13 and 14

As mentioned above, the air filter cartridge 332 includes centerboard 400. The centerboard 400 includes a media portion 430 that is embedded within the media construction 380. In general, in the embodiment shown, the media portion 430 is shown at dimension line 432. Dimension line 432 extends between a bottom edge 434 and a top edge 436. The centerboard 400 also includes first and second side edges 438, 440. The first and second side edges 438, 440 are generally perpendicular to the bottom edge 434. In the embodiment shown, the first side edge 438 and the second side edge 440 are straight and parallel to each other. Of course, in other embodiments, the first and second side edges 438, 440 could be non-straight and not parallel to each other. In general, the bottom edge 434 will be either embedded within the media construction 380 or will be flush with one of the flow faces, typically, the inlet or upstream flow face 338.

Figure 14:
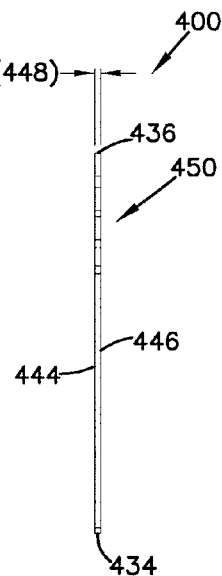
FIG. 14 is an end view of the centerboard of FIG. 13.

The centerboard 400 also defines first and second opposite sides 444, 446 (FIG. 14). Between the first and second sides 444, 446, a thickness 448 (FIG. 14) is defined. The thickness 448 is generally thick enough to be strong, but thin enough to avoid bulkiness. Example thicknesses 448 are described further below.

The centerboard 400 further includes an aperture arrangement 450 extending completely through the centerboard 400 from the first side 444 to the second side 446. The aperture arrangement 450 is defined within the media portion 430 of the centerboard 400. The aperture arrangement 450 is provided to allow adhering sealant to extend through the aperture arrangement 450 to fully bond to itself. That is, an adhering sealant is provided to secure the filter media construction 380 and the centerboard 400 together, such that the adhering sealant flows through the aperture arrangement 450 on both the first and second side 444, 446 so that media 380 on the first side 444 is secured or bonded to media on the second side 446 with the adhering sealant in between and extending through the aperture arrangement 450.

In the embodiment shown, the aperture arrangement 450 includes a plurality of apertures 452. Each of the apertures 452 extends completely through the centerboard 400 in the media portion 430 of the centerboard 400. The apertures 452 are shaped and spaced relative to each other and relative to the fluted media 380 to ensure that each flute that is against the centerboard 400 extends across at least one aperture 452 with contact with adhering sealant. That is, the fluted media 380 includes flutes, as described above, that extend longitudinally in a direction from the top edge 436 to the bottom edge 434. Because of the way the apertures 452 are arranged relative to each other and relative to the fluted media 380, each flute that is against one of the sides 444 or 446 of the centerboard 400 will include at least a portion of the flute that comes in contact with the aperture arrangement 450 and the adhering sealant that is extending through the aperture arrangement 450.

The apertures 452 can be in a variety of configurations. In general, in this embodiment, the apertures 452 are non-rectangular. In this embodiment, the apertures 452 include at least 2 edges 458 that are not parallel to either the bottom edge 434 or to the first and second edges 438, 440. In this particular embodiment, at least some of the apertures 453, 454, 455 are trapezoidal. In this particular embodiment, at least some of the apertures 456, 457 are non-rectangular parallelograms.

In this embodiment, the first and second side edges 444, 446 each define a cutout 460, 461 that is adjacent to the plurality of apertures 452. The cutouts 460, 461 also provide the same function as the aperture arrangement 450, in that they allow for an adhering sealant to extend through the cutouts 460, 461 to bridge the media 380 on the first side 444 to the second side 446.

In the embodiment shown, the cutouts 460, 461 and the plurality of apertures 452 are adjacent to the top edge 436.

In this embodiment, the centerboard 400 includes the handle portion 394 extending axially from the first flow face 381. As described, the handle member 394 includes projection 396 defining open aperture 398 sized to accommodate at least a portion of a human hand. In this embodiment, part of the top edge 436 is along the handle portion 394. The projection 396 defines a grasping segment 362 that is spaced from the media portion 430 of the centerboard 400 by the aperture 398. In the embodiment shown, the handle portion 394 is closer to the second side edge 440 than the first side edge 438, and is generally off-center. The handle portion 394 extends outside of the media construction 380 and is provided to allow a user to manipulate and hold the filter element 332.

In this embodiment, the centerboard 400 further includes a projecting tab 466. The projecting tab 466 extends outside of the media construction 380. Part of the top edge 436 is along the projecting tab 466. The projecting tab 466, in this embodiment, has an outer border that is similar or identical in shape to the outer border of the handle portion 396, although it need not be. In this embodiment, the projecting tab 466 is spaced from the handle portion 394 with a recess 468 therebetween. The projecting tab 466 is located closer to the first side edge 438 than to the second side edge 446. The projecting tab 466 can serve a variety of functions, and in one example, provides a surface for displaying a label to identify the filter element 332.

The adhering sealant will secure the media construction 380 and the centerboard 400 together. The adhering sealant can include a variety of types of sealants including, for example, hot melt, urethane, glue, or adhesive.

In general, to make the filter element 332, the media construction including z-media is coiled around the media portion 430 of the centerboard 400. Typically, the adhering sealant is applied to the corrugated or fluted portion of the z-media, and this adhering sealant will make contact with the media portion 430 of the centerboard 400 and it will extend through the aperture arrangement 450. The adhering sealant will bond with both itself as it extends through the aperture arrangement 450, and it will bond the fluted media construction on the first side 444 of the centerboard 400 to the fluted media construction on the second side 446 of the centerboard. The aperture arrangement 450 is arranged so that each flute that is against the centerboard 400 also extends across the aperture arrangement 450 and is in contact with adhering sealant in the aperture arrangement 450.

The centerboard 400 is constructed so that there are no sharp edges against the media 380. The centerboard 400 can be constructed of a variety of materials including, for example, a non-metal material including, for example, plastic such as general purpose ABS plastic, with general smoothness on both the first and second side 444, 446. One usable material is ABS SP-9010.

An example set of dimensions is provided below that results in usable embodiments.

| Reference Numeral | Example Range (inches unless specified) | Example (inches, unless specified) |
| --- | --- | --- |
| 432 | 3-18 | 7 |
| 448 | 0.08-0.2 | 0.125 |
| 470 | 4-20 | 8.25 |
| 471 | 0.5-1.25 | 0.75 |
| 472 | 0.25-1 | 0.62 |
| 473 | 40-80° | 60° |
| 474 | 0.75-1.5 | 1.28 |
| 475 | 3-6 | 4 |
| 476 | 6-20 | 9.4 |
| 477 | 3-6 | 4 |
| 478 | 2-5.5 | 3 |
| 479 | 0.25-0.75 | 0.5 |
| 480 | 0.75-1.5 | 1.28 |
| 481 | .07-.12 (radius) | 0.09 (radius) |
| 482 | 3-18 | 7.75 |
| 483 | 0.5-1.5 | 1 |
| 484 | 2.75-3.5 | 3.25 |
| 485 | 6-7 | 6.5 |
| 486 | 8-8.75 | 8.25 |
| 487 | 11.25-11.75 | 11.5 |
| 488 | 13.25-14 | 13.75 |
| 489 | 12-18 | 14.69 |

The above provides examples of principles of the invention. Many embodiments can be made using these principles. It is noted that not all the specific features described herein need to be incorporated in an arrangement for the arrangement to have some selected advantage according to the present disclosure.

We claim:

1. A centerboard for use with filter media in constructing an air filter cartridge, the centerboard comprising:
   (a) a board construction having opposite first and second sides;
   (b) the board construction having a plurality of apertures extending completely through the board construction from the first side to the second side; and
   (c) at least some of the apertures in the plurality of apertures are non-circular.

2. A centerboard according to claim 1 wherein:
   (a) at least some of the apertures in the plurality of apertures are non-rectangular.

3. A centerboard according to claim 2 wherein:
   (a) the board construction includes a bottom edge and first and second side edges generally perpendicular to the bottom edge; and
   (b) each of the apertures in the plurality of apertures is defined by at least 2 edges that are not parallel to either the bottom edge or to the first and second side edges.

4. A centerboard according to claim 2 wherein:
   (a) at least some of apertures in the plurality of apertures are trapezoidal.

5. A centerboard according to claim 3 wherein:
   (a) the board construction includes a top edge extending between the first and second side edges and at an opposite end of the board construction from the bottom edge; and
   (b) the first and second side edges each defining a cut-out adjacent to the plurality of apertures.

6. A centerboard according to claim 5 wherein:
   (a) each of the cut-outs and the plurality of apertures is adjacent to the top edge.

7. A centerboard according to claim 6 wherein:
   (a) the board construction includes a handle portion; part of the top edge being along the handle portion;
      (i) the handle portion including a projection having an open aperture sized to accommodate a human hand.

8. A centerboard according to claim 7 wherein:
   (a) the board construction includes a projecting tab; part of the top edge being along the projecting tab;
      (i) the projecting tab being spaced from the handle portion with a recess being between the projecting tab and the handle portion.

9. An air filter cartridge comprising:
   (a) an air filter media construction of fluted media having a first, outlet end, flow face and an opposite, second, inlet end, flow face and being closed to flow of unfiltered air completely therethrough; and
   (b) a centerboard having a media portion embedded within the media construction; the centerboard having first and second opposite sides;
      (i) the media portion that is embedded within the media defining an arrangement extending completely through the centerboard from the first side to the second side; and
      (ii) an adhering sealant securing the centerboard to the media construction;
         (A) at least some adhering sealant extending through the arrangement.

10. An air filter cartridge according to claim 9 wherein:
    (a) the arrangement is shaped and spaced relative to the fluted media to ensure each flute in the fluted media that is against the centerboard extends across at least a portion of the arrangement with adhering sealant.

11. An air filter cartridge according to claim 9 wherein:
    (a) the arrangement includes at least a plurality of apertures.

12. An air filter cartridge according to claim 11 wherein:
    (a) at least some of the apertures in the plurality of apertures are non-circular.

13. An air filter cartridge according to claim 12 wherein:
    (a) at least some of the apertures in the plurality of apertures are non-rectangular.

14. An air filter cartridge according to claim 11 wherein:
    (a) at least some of the apertures in the plurality of apertures are trapezoidal.

15. An air filter cartridge according to claim 11 wherein:
    (a) the centerboard includes a top edge extending between the first and second side edges and at an opposite end of the centerboard from the bottom edge; and
    (b) the first and second side edges each defining a cut-out adjacent to the plurality of apertures.

16. An air filter cartridge according to claim 15 wherein:
    (a) each of the cut-outs and the plurality of apertures is adjacent to the top edge.

17. An air filter cartridge according to claim 15 wherein:
(a) the centerboard includes a handle portion extending outside of the media construction; part of the top edge being along the handle portion;
   (i) the handle portion defining a projection with an open aperture sized to accommodate a human hand.

18. An air filter cartridge according to claim 9 further including:
(a) a gasket arrangement secured to the filter media construction.

19. An air filter cartridge according to claim 9 wherein:
(a) the adhering sealant comprises at least one of hot melt, urethane, glue, or adhesive.

20. A method of making an air filter cartridge; the method comprising:
(a) providing a centerboard including a media portion and having first and second opposite sides;
   (i) the media portion defining an arrangement extending completely through the centerboard from the first side to the second side;
(b) coiling z-media around the media portion of the centerboard; and
(c) while coiling, securing the z-media and the centerboard together by using an adhering sealant that extends through the arrangement of the centerboard.

* * * * *